United States Patent [19]

Kühnlein

[11] Patent Number: 4,637,587
[45] Date of Patent: Jan. 20, 1987

[54] FACILITY FOR THE MONITORING OF PHYSICAL QUANTITIES ON SYSTEMS

[75] Inventor: Klaus Kühnlein, Glattbrugg, Switzerland

[73] Assignee: BBC Brown, Boveri & Company Limited, Baden, Switzerland

[21] Appl. No.: 754,217

[22] Filed: Jul. 12, 1985

[30] Foreign Application Priority Data

Jul. 20, 1984 [CH] Switzerland .................. 3544/84

[51] Int. Cl.⁴ .................. F16K 31/02; F01B 25/16; F01D 21/00
[52] U.S. Cl. .................. 251/29; 251/30.01; 415/17
[58] Field of Search .................. 251/30.02, 29, 30.01; 415/17

[56] References Cited

U.S. PATENT DOCUMENTS 4,007,906 2/1977 Karpenko .................. 251/30.02 X

FOREIGN PATENT DOCUMENTS 3040367 5/1982 Fed. Rep. of Germany.

*Primary Examiner*—Arnold Rosenthal
*Attorney, Agent, or Firm*—Oblon, Fisher, Spivak, McClelland & Maier

[57] ABSTRACT

An apparatus for the monitoring of physical quantities on systems for example for driving a quick-closing valve in turbines, wherein the monitoring itself is performed by monitoring channels which are interconnected in a majority-determining switching logic, primarily 2 of 3 system. The monitoring channels (I, II, III) are formed by a system-dependent number of identical solenoid valves (1, 2, 3).

7 Claims, 4 Drawing Figures

FACILITY FOR THE MONITORING OF PHYSICAL QUANTITIES ON SYSTEMS

BACKGROUND OF THE INVENTION FIELD OF THE INVENTION

This invention relates to an apparatus for the monitoring of physical quantities on systems by monitoring channels which are interconnected in a majority-determining switching logic.

DISCUSSION OF BACKGROUND

DE NO. 30 40 367 A 1 discloses a 2 of 3 channel circuit in which each monitoring channel is assigned an electrical switch actuated by means of an hydraulic pressure switch, a solenoid valve and an overhung diaphragm-sealed piston. The piston itself has double-ended impingement: in one direction via the solenoid valves of two channels in each case, in the other direction by the intake throttled by a restrictor.

Consequently, this facility, which is used for the control of, for example, a quick-closing valve on turbines, consists of the logical interconnection of three elements in each case per monitoring channel, namely of pressure switch, solenoid valve and piston, the latter being captured in a common hydraulic block for all monitoring channels.

A disadvantage of this concept is the fault susceptibility of the logic elements in combination with one another and the expensive production of the hydraulic block.

SUMMARY OF THE INVENTION

Accordingly, one object of this invention is to provide a novel apparatus for monitoring of physical quantities on systems, which remedies the disadvantage of the conventional apparatus.

Another object of this invention is to provide a novel apparatus in which the number of logically connected elements per monitoring channel in the facility of the above-noted type is reduced.

These and other objects are achieved according to the invention by providing a novel apparatus for the monitoring of physical quantities on systems by monitoring channels which are interconnected in a majority-determining switching logic, primarily 2 of 3 system, wherein the monitoring channels are formed by a system-dependent number of identical solenoid valves.

The advantage of the invention can be seen essentially in the fact that each monitoring channel now consists of a single solenoid valve. The connection of the solenoid valves with one another is without lines, i.e. they are directly fixed on a hydraulic block. This means that the use of pistons, diaphragms, pipelines, seals etc. can be dispensed with so that each monitoring channel only has one movable part and no movable parts at all are necessary for the interconnection of the switching logic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which are diagrammatic illustrations of an exemplary embodiment of the invention in four different operational flows.

All elements unnecessary for direct understanding of the invention have been omitted. The flow direction of the working medium is indicated by arrows. In the drawing

DESCRIPTION OF THE PREFERRED EMBODIMENTS

Figure 1:
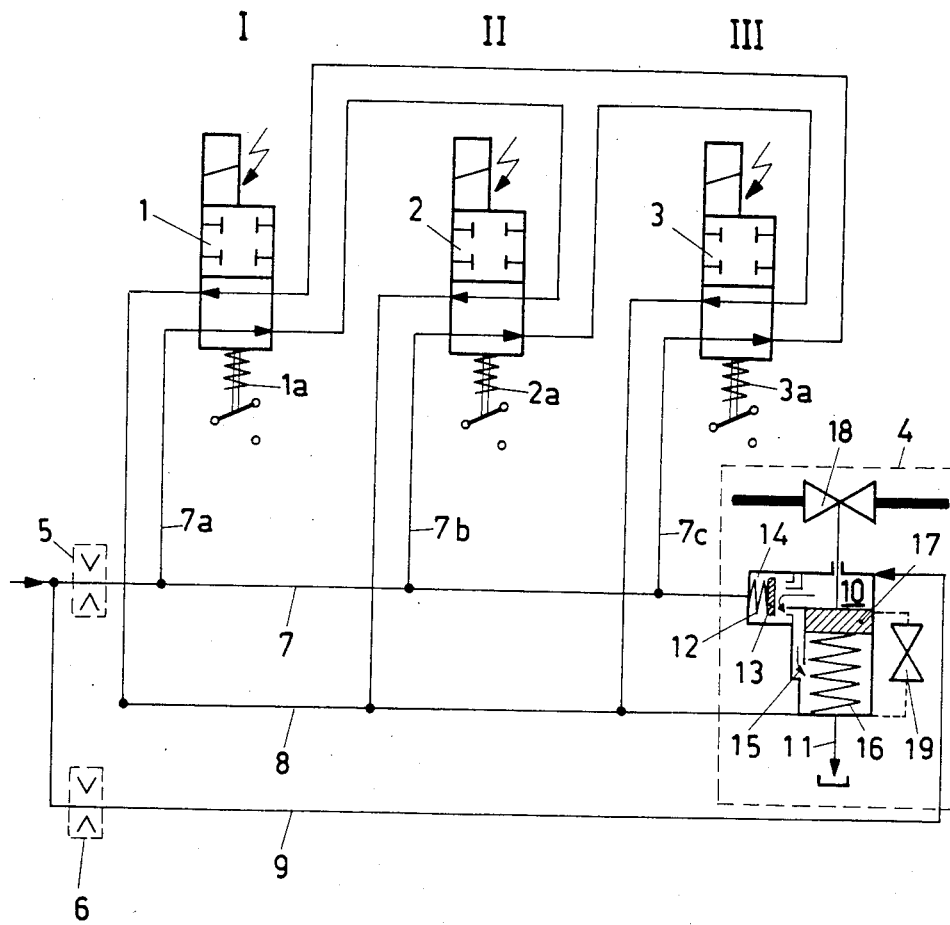
FIG. 1 shows the correct function of the switching logic upon initiation-all three solenoid valves are de-excited.

Referring now to the drawings, wherein like reference numerals designate identical or corresponding parts throughout the several views, FIG. 1 shows the circuit of a switching logic consisting of three monitoring channels I, II, III. These channels are formed from individual commercially available 4-way solenoid valves 1, 2, 3 which drive the quick-closing valve 4 of a turbine (not shown). The passage of the control oil 7 is limited upstream of the branch-off to the individual solenoid valves 1, 2, 3 by an orifice plate 5. Via the first branch 7a the control oil 7 flows through the solenoid valves 1 and 2, via the second branch 7b the solenoid valves 2 and 3 are actuated and via the third branch 7c, the solenoid valves 3 and 1 are linked up in flow. As in this case all three solenoid valves 1, 2, 3 are de-excited, the control oil 7 leaving via the branches 7a, 7b, 7c flows into the drain line 8 and from there onto the drain 11 of the system. Upstream of the orifice plate 5 is a branch for fuel oil 9, an orifice plate 6 downstream ensuring that the amount of oil flowing through there is limited to a fixed value. The fuel oil 9 passes into a cylinder chamber 10, flows through the chamber 12 of the control flap 13, which is slightly pre-tensioned by a spring 14, and then flows off via a drain chamber 15. This is possible because the control oil 7 is not admitted to the control flap chamber 12. In this arrangement, the quick close is correctly initiated.

Only when the control oil 7 can no longer flow off via the drain line 8, i.e. the control oil line 7 cannot empty itself, does a pressure build up in the control flap chamber 12, with the effect that the control flap 13 closes and the fuel oil 9 can move down the piston 17, which is pre-tensioned by a spring 16, causing a through-flow valve 18 to be opened: this cancels the quick close. This is always the case if at least, as revealed by the subsequently described FIG. 3, two solenoid valves are excited simultaneously.

A check valve 19 is used for the partial lift check of the through-flow valve 18 and is intended to provide information as to its free mobility.

Each solenoid valve 1, 2, 3 has a function monitor 1a, 2a, 3a equipped by means of mechanical contact. This makes it possible to check the correct individual function in a manual initiation of individual solenoid valves.

Figure 2:
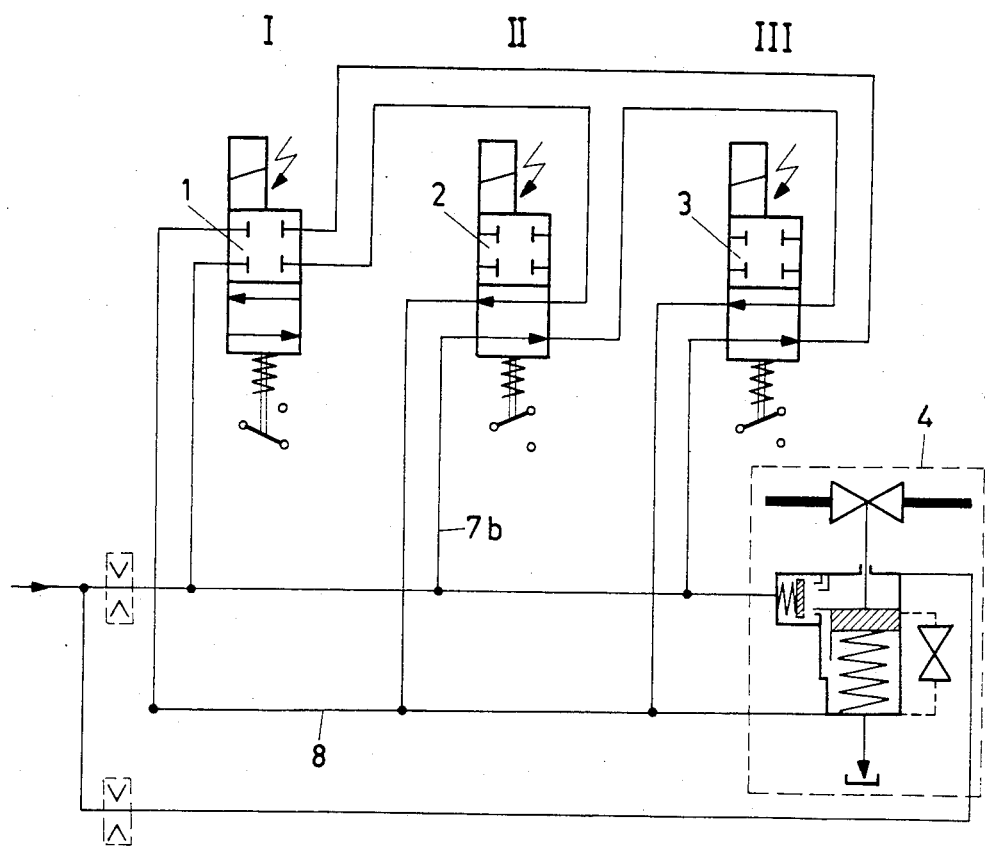
FIG. 2 shows a malfunction upon initiation-one solenoid valve remains in standby position or is excited for test purposes.

As is revealed by FIG. 2, the solenoid valves 2 and 3 are de-excited by an operational fault, whereas solenoid valve 1, with a malfunction, is in standby position or is excited for test purposes. In this arrangement, the drain line 8 empties itself via the branch 7b and the two de-excited solenoid valves 2 and 3. The monitoring channels I–II and III–I are closed. The quick-closing valve 4 closes or remains closed.

Figure 3:
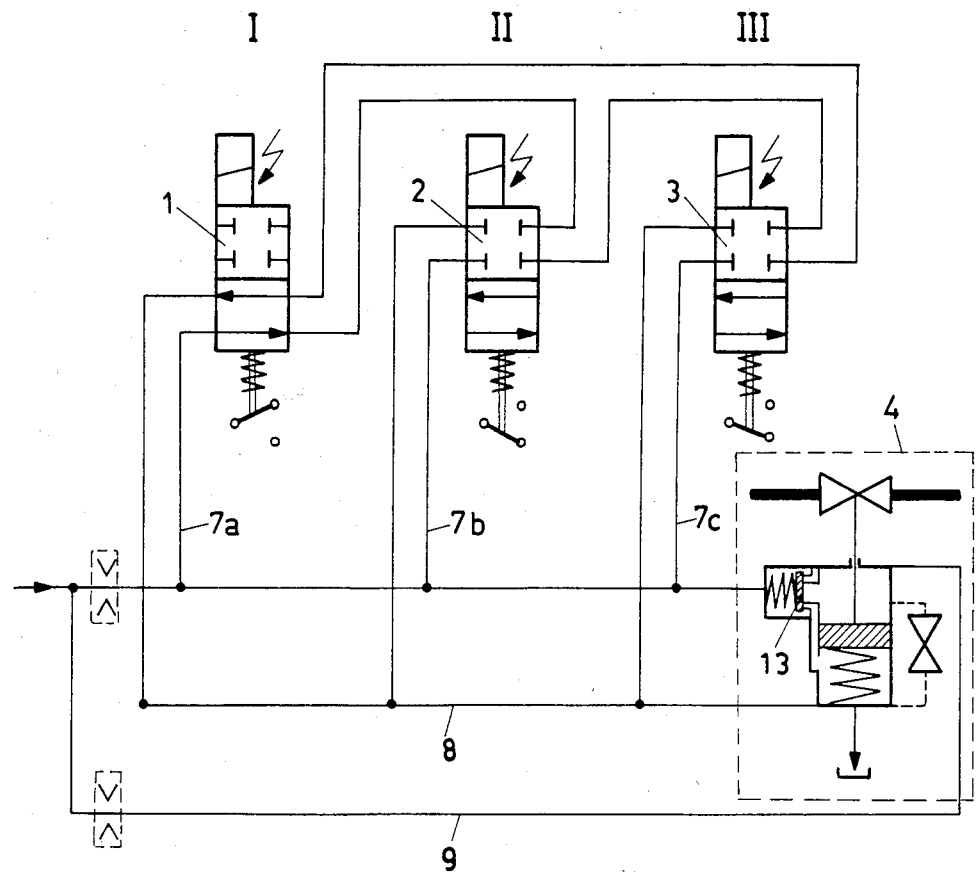
FIG. 3 shows a malfunction in operation-one solenoid valve goes into initiation position or is de-excited for test purposes.

In FIG. 3, due to a malfunction, the solenoid valve 1 is in initiation position or is de-excited for test purposes, whereas the solenoid valves 2 and 3 are excited in operating position. The drain line 8 cannot empty itself as the two excited solenoid valves 2 and 3 block the path (branches 7b, 7c) via the de-excited solenoid valve 1. The branch 7a itself is blocked via the excited solenoid valve 2. The fact that the control flap 13 now closes causes the fuel oil 9 to open the quick-closing valve 4. For test purposes, therefore, each solenoid valve can be de-excited successively without special precautions: the quick-closing valve 4 remains open.

FIGS. 2 and 3 reveal that the channel I has a fault, whereas the two other, correctly functioning channels II, III determine the position of the quick-closing valve 4. Of course this is only an example: as the system is of functionally symmetrical design, instead of the faulty solenoid valve 1 another solenoid valve (2 or 3) could quite easily be in the incorrect position.

Figure 4:
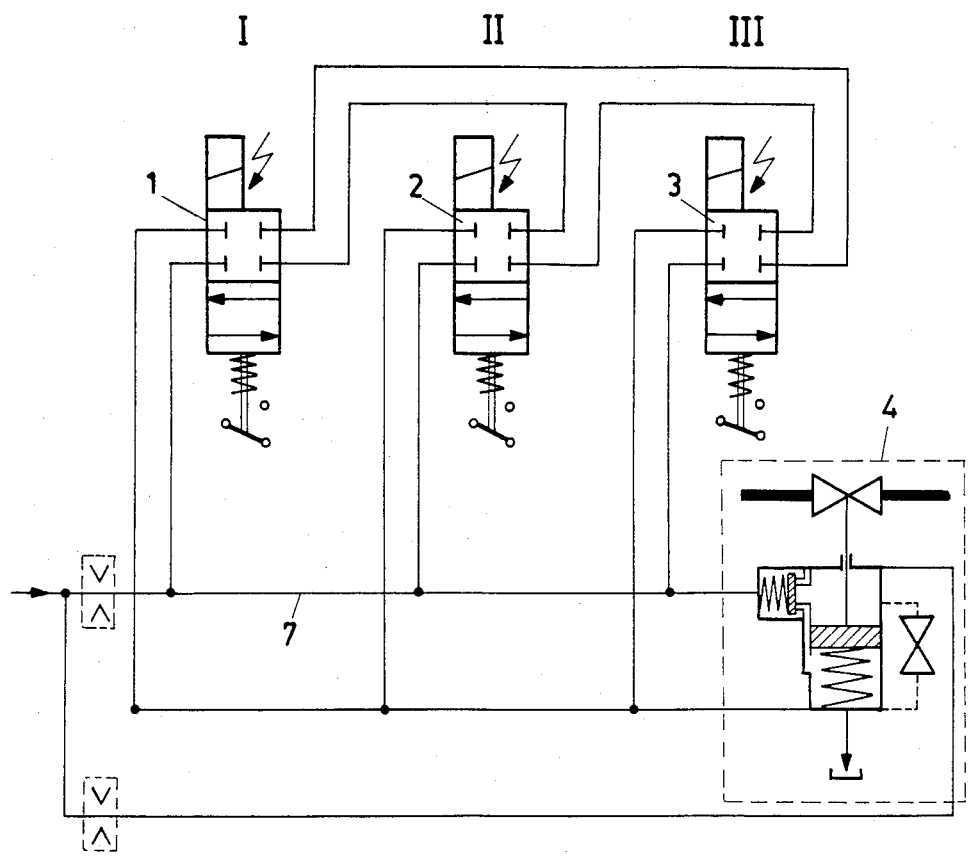
FIG. 4 shows the correct function in operation-all three solenoid valves are excited.

FIG. 4 shows a correct operating status in which all three solenoid valves 1, 2, 3 are excited. The control oil line 7 is under pressure: the quick-closing valve 4 is, in analogy to FIG. 3, open.

Obviously, numerous modifications and variations of the present invention are possible in light of the above teachings. It is therfore to be understood that within the scope of the appended claims, the invention may be practiced otherwise than as specifically described herein.

What is claimed as new and desired to be secured by Letters Patent of the United States is:

1. An apparatus for the monitoring of physical quantities on systems, said apparatus comprising:
   (a) a quick closing valve comprising:
      (i) first, second, and third chambers;
      (ii) a first path of fluid communication from said first chamber to said third chamber through said second chamber;
      (iii) first valve means for closing said first path of fluid communication in response to an increase in pressure in said second chamber to a value about a first predetermined value;
      (iv) a drain to tank in fluid communication with said third chamber; and
      (v) second means for actuating a through-flow valve in response to an increase in pressure in said first chamber to a value above a second predetermined value;
   (b) a second path of fluid communication for supplying fluid under pressure to said second chamber;
   (c) a third path of fluid communication for supplying fluid under pressure to said first chamber;
   (d) first, second, and third four-way solenoid valves;
   (e) a fourth path of fluid communication for conducting fluid under pressure from said second path of fluid communication through first said first four-way solenoid valve and then through said second four-way solenoid valve to tank;
   (f) a fifth path of fluid communication for conducting fluid under pressure from said second path of fluid communication through first said second four-way solenoid valve and then through said third four-way solenoid valve to tank; and
   (g) a sixth path of fluid communication for conducting fluid under pressure from said second path of fluid communication through first said third four-way solenoid valve and then through said first four-way solenoid valve to tank, whereby:
   (h) when said fourth, fifth, and sixth paths of fluid communication are all open, the pressure in said second chamber does not reach said first predetermined value, said first valve means remains open, the pressure in said first chamber remains beneath said second predetermined value, and said through-flow valve remains un-actuated;
   (i) when one of said fourth, fifth, and sixth paths of fluid communication is closed and the other two of said fourth, fifth, and sixth paths of fluid communication are both open, the pressure in said second chamber does not reach said first predetermined value, said first valve means remains open, the pressure in said first chamber remains beneath said second predetermined value, and said through-flow valve remains un-actuated; and
   (j) when at least two of said fourth, fifth, and sixth paths of fluid communication are closed, the pressure in said second chamber reaches a value above said first predetermined value, said first valve means closes, the pressure in said first chamber reaches a value above said second predetermined value, and said through-flow valve is actuated.

2. An apparatus as recited in claim 1 and further comprising a first orifice plate in said second path of fluid communication upstream of the branch points between said second path of fluid communication and said fourth, fifth, and sixth paths of fluid communication.

3. An apparatus as recited in claim 2 wherein said third path of fluid communication communicates with said second path of fluid communication upstream of said first orifice plate.

4. An apparatus as recited in claim 3 and further comprising a second orifice plate in said third path of fluid communication downstream of the branch point between said second path of fluid communication and said third path of fluid communication.

5. An apparatus as recited in claim 1 wherein said third path of fluid communication communicates with said second path of fluid communication.

6. An apparatus as recited in claim 5 and further comprising a second orifice plate in said third path of fluid communication downstream of the branch point between said second path of fluid communication and said third path of fluid communication.

7. An apparatus as recited in claim 1 wherein said through-flow valve is closed when it is actuated.

* * * * *